United States Patent [19]

Milner

[11] 4,325,175
[45] Apr. 20, 1982

[54] FASTENER AND METHOD OF FASTENING

[76] Inventor: Nathan Milner, 404 Bordeaux, Marais Rd., Sea Point, Cape Town, South Africa

[21] Appl. No.: 67,461

[22] Filed: Aug. 17, 1979

[30] Foreign Application Priority Data

Aug. 30, 1978 [ZA] South Africa ................ 78/4951

[51] Int. Cl.³ .................... B23P 11/00; B65D 63/02; F16L 33/22; F16L 3/08
[52] U.S. Cl. .................... 29/444; 29/522 R; 29/526 R; 24/20 R; 24/277; 248/74 R; 403/197; 403/200
[58] Field of Search ............... 29/526 R, 522 R, 437, 29/444; 24/275, 200 R, 276, 20 C, 20 W, 277, 20 EE, 20 TT, 20 L, 20 S; 403/194, 197, 200; 248/74 R, 205 R

[56] References Cited

U.S. PATENT DOCUMENTS

| 833,662 | 10/1906 | Bartholomay | 248/74 R |
| 1,514,411 | 11/1924 | Wilkinson | 24/276 |
| 1,514,412 | 11/1924 | Wilkinson | 24/276 |
| 3,400,436 | 9/1968 | Jablonski | 24/275 |
| 4,180,228 | 12/1979 | Snyder et al. | 248/74 R |

*Primary Examiner*—Charlie T. Moon
*Attorney, Agent, or Firm*—Gottlieb, Rackman & Reisman

[57] ABSTRACT

An apparatus and method for fastening one member to another includes a holding member with a holding formation, the shape of which is complementary to the shape of the member to be held, and at least one bolt with an axial bore therethrough for receiving the holding member therein. The bolt is screwed into a threaded hole in a located member to apply tension to the holding formation of the holding member to secure the holding member to the member to be held.

10 Claims, 2 Drawing Figures

FASTENER AND METHOD OF FASTENING

This invention relates to a method of fastening two members to each other, and to a threaded fastener for carrying out the method.

SUMMARY OF THE INVENTION

A method of fastening one member to another according to the invention includes the steps of positioning a first member against a second, passing a rod-like holding member which has a formation at one end for holding the first member through an axial bore in a bolt so as to be freely rotatable in the bore, upsetting the end of the holding member remote from the holding formation against the stud of the bolt, locating the bolt in a threaded hole in the second member, engaging the formation of the holding member with the first member, and screwing the bolt into the hole effectively to shorten the length of the holding member to stress it between its holding formation and the upset portion against the mouth of the bore of the stud of the bolt.

A fastener according to the invention includes a bolt having an axial bore therethrough and an elongate headed holding member adapted to pass freely through the bore in the bolt with the head on the holding member bearing on the mouth of the bore at the front of the stud of the bolt so that the member is effectively shortened as the bolt is screwed into a threaded hole in a located member.

A bolt for a fastener according to the invention includes an axial bore which passes through the bolt.

BRIEF DESCRIPTION OF THE DRAWINGS

The invention is now described by way of example with reference to the drawings in which.

DETAILED DESCRIPTION OF THE DRAWINGS

Figure 1:
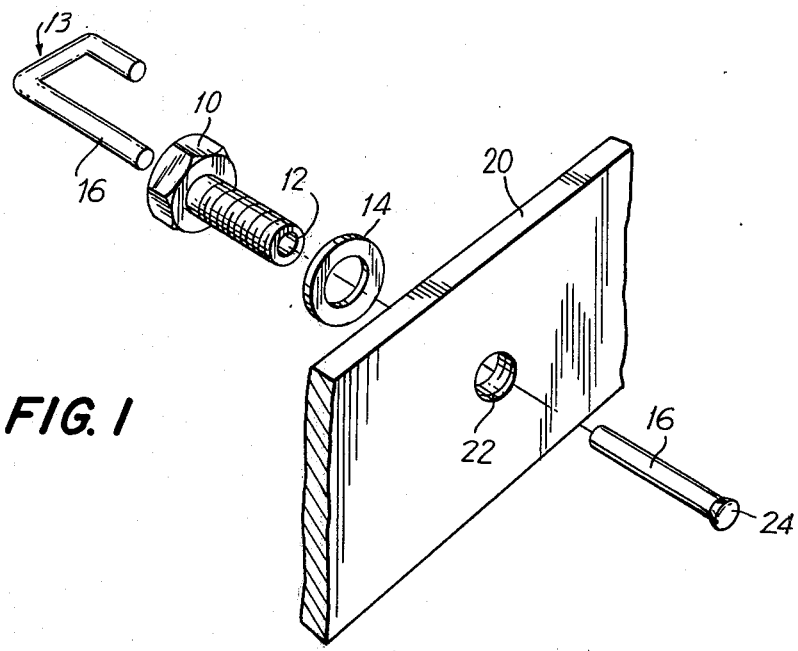
FIG. 1 is an exploded perspective view of a fastener according to the invention.

The fastener of the invention is shown in FIG. 1 to consist of a bolt 10 which includes a bore 12 which passes axially through the bolt, a washer 14 and a rod-like holding member 16. The holding member 16 is discontinuous in the drawing for clarity of illustration, although it is to be understood that the holding member 16 is of one-piece construction.

The holding member includes at one end a holding formation 18. The shape of the holding formation is dependent on the shape of a member which is to be held by the fastener to a second member 20. In this example of the invention the formation 18 could be used to hold any object having an edge, such as an angled beam or one lip of a channel-shaped member, to the member 20.

In use, the distance between the edge of the member to be held to the member 20 and the tip of the stud of the bolt, when fully located in a threaded hole 22 in the member 20, is measured. The end of the holding member 16 remote from the formation 18 is then passed through the bore of the bolt from the headed side of the bolt and upset to provide a head 24 which is larger in diameter than the bore 12 through the bolt and smaller in diameter than the hole 22. It is important that the distance separating the formation 18 from the head 24 of the holding member is less than the above measurement so that when the bolt is screwed into the hole 22 the effective length of the holding member 16 will, when the bolt is fully pulled up, effectively be shorter than the above measurement so that the holding member is stressed between the nose of the bolt stud and the formation 18 to hold the two members firmly together.

Figure 2:
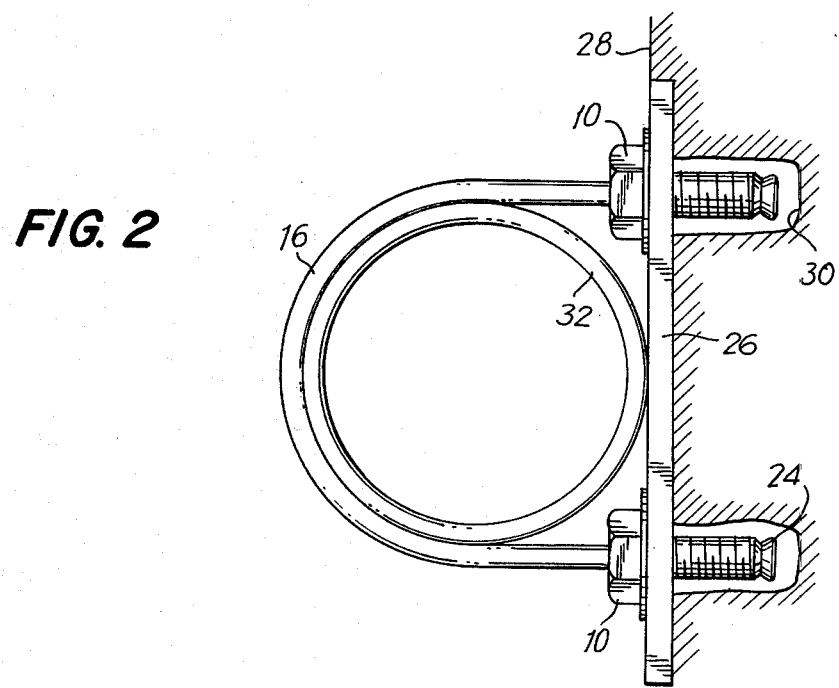
FIG. 2 is a partially sectioned plan view of the fasteners of the invention holding a pipe to a wall.

The fastener of the invention finds particular application in situations where one member is to be fastened to a flat surface behind which it is difficult, if not impossible, to fasten a nut to a bolt. FIG. 2 illustrates such an application where two of the fasteners of the invention are used to hold a pipe to a surface.

FIG. 2 shows a metal plate 26 which is either fixed to or embedded in a wall 28 with cavities 30, which are made in the wall prior to location on the plate, in register with threaded holes in the plate.

The holding member 16, in this embodiment, is upset at one end and passed from the stud end through one of the bolts 10. The bolt holding the holding member is then located in one of the holes in the plate 26.

A pipe 32 is then positioned against the plate 26 and the distance measured from the head of the located bolt, around the periphery of pipe 32, to what will be the fully located position of the free end of the stud of the second bolt. The holding member is then cut to that dimension and the cut end passed through the bore of the second bolt from the headed side of the bolt. The cut end of the holding member is then upset and the bolt screwed into the second hole in the plate 26 to tension the holding member about the pipe 32.

To exactly determine the length of the holding member so that the bolts are fully pulled up is difficult unless the holding member is made from a material having a sufficient modulus of elasticity. The problem does not arise, however, if the bolts are not fully pulled up, as the outward stress between the threads on the bolts and the threads in the holes in the plate 26 will serve to lock the bolts in position.

With standard size pipes and bolts the holding member and its bolts could be prefabricated. Additionally, semi-circular spacers could be provided with the prefabricated fasteners for holding pipes of smaller diameter than the pipe 32 to a wall.

The invention is not limited to the precise constructional details as herein described and instead of the hole 22 in the member 20 being threaded a nut could be welded to the back of the member and such modifications may be made without departing from the spirit and scope of the present invention, as set forth in the appended claims.

I claim:

1. A method of fastening a first member to a second member comprising
   (a) positioning the first member adjacent to the second member,
   (b) passing a holding member having a free end, a holding end and a holding formation at the holding end through a bolt having a head end, an externally-threaded stud end and an axial bore therein from the head end of the bolt so that the holding member is freely rotatable in the bore, the shape of the holding formation being complementary to the shape of the first member for engagement therewith,
   (c) forming a head at the free end of the holding member, said head adapted to bear on the mouth of the bore at the stud end of the bolt, (d) locating the bolt in a threaded hole in the second member, (e) engaging the holding formation of the holding member with the first member, and (f) screwing the bolt into the threaded hole to apply tension between the holding formation of the holding member and the free end of the holding member to secure the first member to the second member.

2. A method in accordance with claim 1 further comprising, prior to step (c), locating the bolt fully in the threaded hole in the second member, measuring the distance between the edge of the first member to be held and the tip of the stud end of the bolt, and choosing the length of the holding member such that it is less than said measurement.

3. A method in accordance with claim 2 wherein step (c) comprises upsetting the free end of the holding member against the mouth of the bore at the stud end of the bolt.

4. A method in accordance with claim 3 wherein the holding formation is U-shaped.

5. A method of fastening a first member to a second member comprising (a) positioning the first member adjacent to the second member, (b) selecting a fastener comprising a holding member having a headed end, a holding end and a holding formation at the holding end, and a bolt having a head end, an externally-threaded stud end and an axial bore therein, said holding member and said bolt being positioned with respect to one another such that the holding member is freely rotatably in the bore of the bolt, the shape of the holding formation being complementary to the shape of the first member for engagement therewith, (c) locating the bolt in a threaded hole in the second member, (d) engaging the holding formation of the holding member with the first member, and (e) screwing the bolt into the threaded hole to apply tension between the holding formation of the holding member and the headed end of the holding member to secure the first member to the second member.

6. A method of fastening a first member to a second member comprising (a) passing a holding member having a free end, a headed end and a holding formation therebetween through a first bolt having a head end, an externally-threaded stud end and an axial bore therein from the stud end of the first bolt so that the holding member is freely rotatable in the bore of the first bolt, (b) locating the first bolt in a first threaded hole in the second member, (c) positioning the first member adjacent to the second member, (d) locating a second bolt having a head end, an externally-threaded stud end and an axial bore therein fully in a second threaded hole in the second member, (e) measuring the distance from the head end of the first bolt around the first member to the stud end of the second bolt, (f) removing the second bolt from the second threaded hole, (g) choosing the length of the holding member such that it is equal to said measurement, (h) passing the free end of the holding member around the first member and through the bore of the second bolt from the head end of the second bolt, such that the holding formation engages the first member and is freely rotatable in the bore of the second bolt, (i) forming a head at the free end of the holding member, said head adapted to bear on the mouth of the bore at the stud end of the second bolt, (j) locating the second bolt in the second threaded hole in the second member, and (k) screwing the bolts into their respective threaded holes to apply tension to the holding member and to secure the holding member about the first member.

7. A method in accordance with claim 6 wherein step (i) comprises upsetting the free end of the holding member against the mouth of the bore at the stud end of the bolt.

8. An assembly including a fastener for securing a first member to a second member, the fastener comprising at least one bolt having a head end, an externally-threaded stud end an an axial bore therein, a holding member adapted to pass through and be freely rotatable in the bore in said at least one bolt, and a head formed at one end of the holding member for bearing on the mouth of the bore at the stud end of said at least one bolt, said holding member also including a holding formation adapted to engage with the first member, and said second member also including at least one threaded hole, said at least one bolt being adapted to be screwed into said at least one threaded hole to secure the first member adjacent to the second member.

9. An assembly in accordance with claim 8 wherein said at least one bolt comprises one bolt, and wherein the holding formation is U-shaped.

10. An assembly in accordance with claim 8 wherein said at least one bolt comprises a first bolt and a second bolt, wherein the second member includes a second threaded hole for receiving said second bolt, and wherein the holding formation is semi-circular in shape, said assembly further comprising a second head formed on the other end of the holding member for bearing on the mouth of the second bolt.

* * * * *